(12) United States Patent
Yoshioka et al.

(10) Patent No.: US 6,415,772 B1
(45) Date of Patent: Jul. 9, 2002

(54) EVAPORATIVE EMISSION CONTROL SYSTEM

(75) Inventors: Mamoru Yoshioka, Susono; Takanori Taga, Nagoya, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/721,966

(22) Filed: Nov. 27, 2000

(30) Foreign Application Priority Data

Dec. 21, 1999 (JP) .......................................... 11-362735

(51) Int. Cl.[7] .............................................. F02M 37/04
(52) U.S. Cl. ........................................ 123/518; 123/516
(58) Field of Search ................................. 123/516, 518, 123/519, 520, 521, 198 D

(56) References Cited

U.S. PATENT DOCUMENTS

| | | | | |
|---|---|---|---|---|
| 4,940,397 A | * | 7/1990 | Kuhlen | 417/435 |
| 5,474,048 A | * | 12/1995 | Yamazaki et al. | 123/519 |
| 5,564,466 A | * | 10/1996 | Aoyama et al. | 137/493.8 |
| 5,579,742 A | * | 12/1996 | Yamazaki et al. | 123/520 |
| 5,584,278 A | * | 12/1996 | Satoh et al. | 123/516 |
| 6,003,499 A | * | 12/1999 | Devall et al. | 123/520 |
| 6,029,635 A | * | 2/2000 | Sekine et al. | 123/516 |

* cited by examiner

*Primary Examiner*—Carl S. Miller
(74) *Attorney, Agent, or Firm*—Finnegan, Henderson, Farabow, Garrett & Dunner, L.L.P.

(57) ABSTRACT

An evaporative emission control system is provided wherein a differential pressure valve includes a diaphragm that separates a back pressure chamber and a tank chamber from each other, and has a communication hole formed therethrough. The differential pressure valve is placed in an open state in which the diaphragm is spaced apart from a valve seat, or a closed state in which the diaphragm rests on the valve seat. The differential pressure valve further includes a closure member for closing the communication hole when the differential pressure valve is placed in the closed state, and the communication hole communicates with the back pressure chamber and the tank chamber when the differential pressure valve is in the open state.

7 Claims, 11 Drawing Sheets

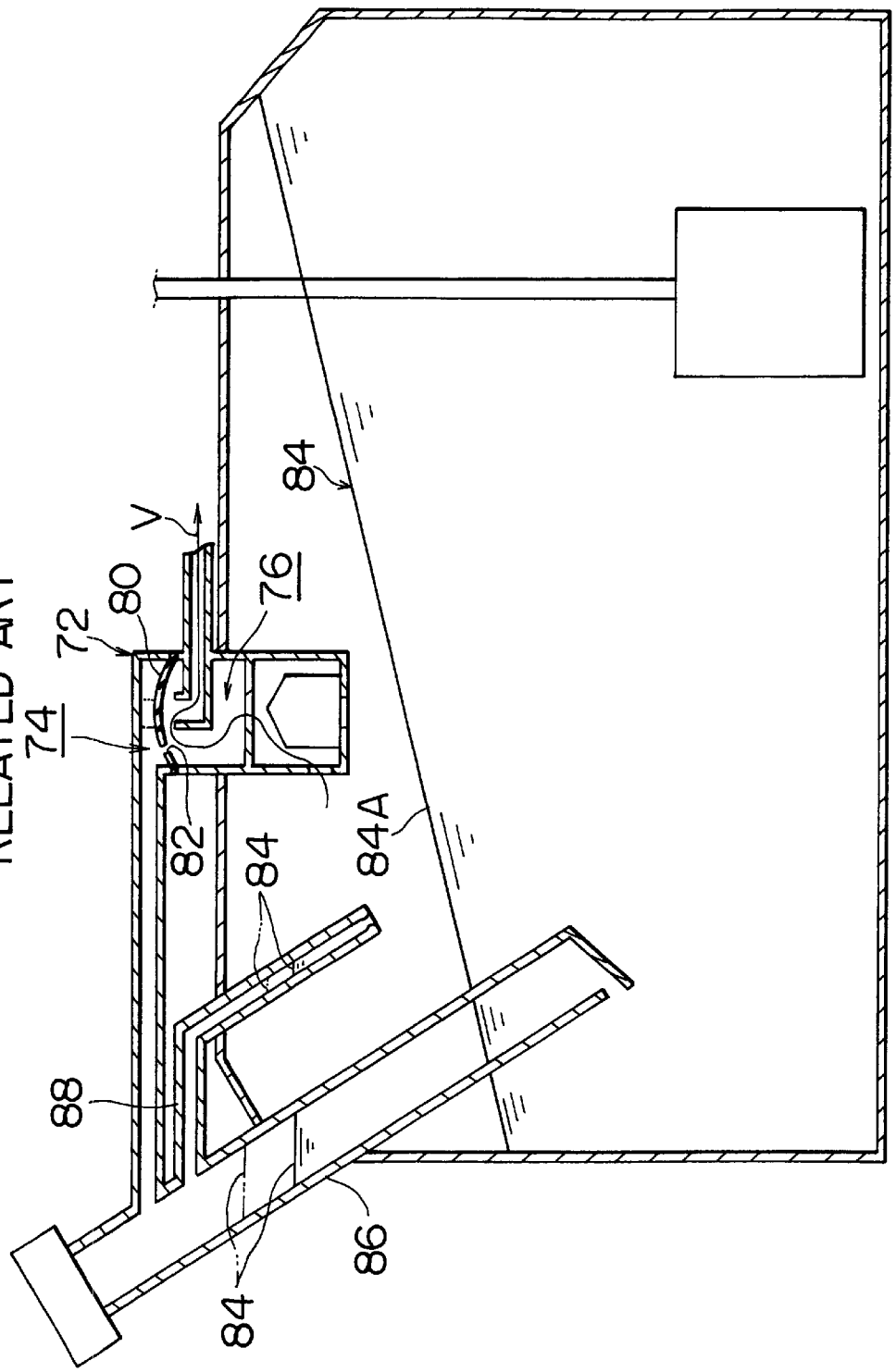

EVAPORATIVE EMISSION CONTROL SYSTEM

INCORPORATION BY REFERENCE

The disclosure of Japanese Patent Application No. 11-362735 filed on Dec. 21, 1999 including the specification, drawings and abstract is incorporated herein by reference in its entirety.

BACKGROUND OF THE INVENTION

1. Field of the Invention

The present invention relates to an evaporative emission control system and, more particularly, to an evaporative emission control system for a fuel tank installed in a motor vehicle, such as an automobile.

2. Description of Related Art

It has been known in the art that a fuel tank installed in a motor vehicle, such as an automobile, be equipped with an evaporative emission control system which prevents fuel evaporative emission (fuel vapors) generated in the fuel tank from flowing or escaping to the outside of the tank. One example of such a system is disclosed in Japanese Laid-Open Patent Publication (Kokai) No. HEI 8-276757.

In such an evaporative emission control system, as shown in FIG. 10 by way of example, a back pressure chamber 74 and a tank chamber 76 of a differential pressure valve 72 mounted in a fuel tank 70 are separated or partitioned from each other by a diaphragm, constituting a valve portion 80. A communicating hole 82 for communication between the back pressure chamber 74 and the tank chamber 76 of the differential pressure valve 72 is formed through the valve portion 80. With this arrangement, liquid fuel that has flown into he back pressure chamber 74 of the differential pressure valve 72 may be returned into the fuel tank 70 through the communicating hole 82.

In the above evaporative emission control system, if the liquid surface 84A of the fuel 84 in the fuel tank 70 is inclined such that its level becomes higher on the side of a fuel fill pipe 86 than on the other side of the tank, during a vehicle turn or other mode of running of the vehicle, as shown in FIG. 10, the air pressure in the back pressure chamber 74 escapes or releases into the tank chamber 76 through the communicating hole 82, as indicated by an arrow W1 in FIG. 10. Thus, a large amount of fuel 84 is likely to flow into the fuel fill pipe 86 and a recirculation conduit 88 formed in communication with the fill pipe 86.

When the fuel tank 70 shifts from the state as shown in FIG. 10, to the state in which the liquid surface 84A of the fuel 84 in the fuel tank 70 is inclined such that its level is lower on the side of the fuel fill pipe 86 than on the other side as shown in FIG. 11, a relatively long period of time is required until a large amount of fuel 84 that has entered the fill pipe 86 and the recirculation conduit 88 returns to the inside of the fuel tank 70. During the period of time in which the large amount of fuel 84 that has entered the fill pipe 86 and the recirculation conduit 88 takes to return to the inside of the fuel tank 70, a negative pressure builds up in the back pressure chamber 74 of the differential pressure valve 72, whereby the valve portion 80 is placed in the open position. As a result, a large amount of evaporative fuel flows from the fuel tank 70 to a canister (not shown).

SUMMARY OF THE INVENTION

It is therefore an object of the present invention to provide an evaporative emission control system capable of reducing the amount of evaporative fuel that flows into a canister during running of the vehicle.

To accomplish the above object, the present invention provides an evaporative emission control system. A differential pressure valve controls fluid communication between a canister and a fuel tank. The differential pressure valve includes a diaphragm that separates a first chamber and a second chamber of the differential pressure valve from each other, and a valve seat that faces the diaphragm, the differential pressure valve being placed in a selected one of an open state in which the diaphragm is spaced apart from the valve seat, and a closed state in which the diaphragm rests on the valve seat. The diaphragm has a communicating hole formed therethrough. A closure member is positioned and configured to close the communicating hole of the diaphragm when the differential pressure valve is placed in the closed state, the communicating hole communicating with the first and second chambers when the differential pressure valve is placed in the open state.

In the aforementioned evaporative emission control system, when the liquid surface of fuel within the fuel tank is inclined during a vehicle turn or other running mode of the vehicle, such that the level of the liquid surface becomes higher on the side of a fuel fill pipe than on the other side of the fuel tank, the differential pressure valve is placed in the closed state with the diaphragm resting upon the valve seat, and therefore the communicating hole formed through the diaphragm is closed by the closure member. As a result, the air pressure in the back pressure chamber is inhibited from escaping into the tank chamber through the communicating hole, and therefore only a small amount of fuel is introduced into the fuel fill pipe. If the liquid surface of fuel within the fuel tank is subsequently inclined such that the level of the liquid surface becomes lower on the side of the fuel fill pipe than on the other side of the fuel tank, a negative pressure is produced in the back pressure chamber of the differential pressure valve, whereby the diaphragm is lifted away from the valve seat. In this state, since the communicating hole communicates with the back pressure chamber and the tank chamber, the small amount of fuel that has entered the fill pipe can return to the fuel tank within a short period of time. Although the diaphragm is spaced apart from the valve seat (the differential pressure valve is held in the open state) while the fuel that has entered the fill pipe 12 is returning to the fuel tank, it is possible to restrict or reduce the amount of evaporative fuel flowing toward the canister during running of the vehicle because only a short period of time is required to drain the fill pipe.

To accomplish the above object, the present invention also provides a differential pressure valve that controls fluid communication between a canister and a fuel tank. The differential pressure valve includes a diaphragm that separates a back pressure chamber and a tank chamber of the differential pressure valve from each other, and a valve seat that faces the diaphragm, the differential pressure valve being opened when the diaphragm is moved away from the valve seat. The differential pressure control valve includes a communicating portion that communicates with the back pressure chamber and the tank chamber, and a closure member positioned and configured to close the communicating portion when a pressure within the back pressure chamber is higher than a pressure within the tank chamber. The closure member permits the communicating portion to communicate with the back pressure chamber and the tank chamber before opening of the differential pressure valve when the pressure within the back pressure chamber becomes lower than the pressure within the tank chamber.

In one preferred embodiment of the invention, the closure member as indicated just above may be a check valve.

In the aforementioned evaporative emission control system, when the liquid surface of fuel within the fuel tank is inclined during a vehicle turn or other running mode of the vehicle, such that the level of the liquid surface becomes higher on the side of the fuel fill pipe than on the other side of the fuel tank, a pressure higher than at least the pressure in the tank chamber is applied to the back pressure chamber of the differential pressure valve, and the communicating portion between the back pressure chamber and the tank chamber is closed by the check valve. As a result, the air pressure in the back pressure chamber is kept from escaping into the tank chamber through the communicating portion, and therefore only an extremely small amount of fuel flows into the fuel fill pipe. If the liquid surface of fuel within the fuel tank is subsequently inclined such that the level of the liquid surface becomes lower on the side of the fuel fill pipe, the fuel that has entered the fill pipe can be returned to the fuel tank within an extremely short period of time. With the fuel in the fuel fill pipe thus returned to the fuel tank, a negative pressure builds up in the back pressure chamber of the differential pressure valve, with a result that the check valve is opened before the diaphragm is lifted away from the valve seat. Thus, the fuel that has entered the fill pipe can be returned to the fuel tank without requiring the diaphragm to be lifted away from the valve seat. It is thus possible to prevent or inhibit evaporative fuel from flowing into the canister during running of the vehicle.

BRIEF DESCRIPTION OF THE DRAWINGS

FIG. 11 is a schematic cross-sectional view of the known evaporative emission control system of FIG. 10, in which the level of the liquid surface of fuel has been changed from the state of FIG. 10.

DETAILED DESCRIPTION OF THE PREFERRED EMBODIMENTS

Figure 1:
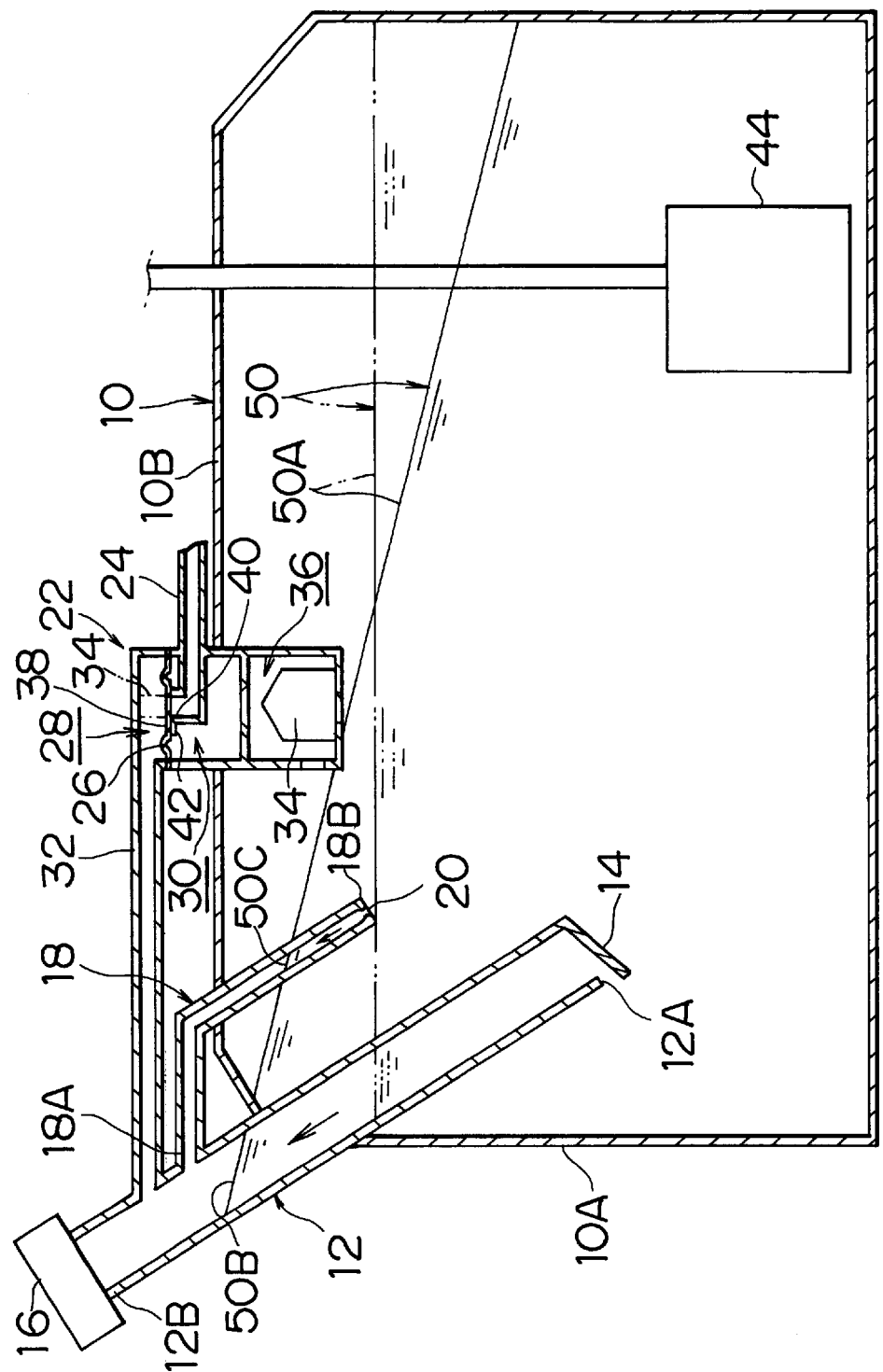
FIG. 1 is a schematic cross-sectional view of an evaporative emission control system according to a first embodiment of the invention.

An evaporative emission control system according to the first embodiment of the invention will be described with reference to FIG. 1 through FIG. 5.

In this embodiment, a fuel fill pipe 12 is fitted in a through-hole formed in a side wall portion 10A of a fuel tank 10, and one end 12A of the fill pipe 12 is located within the fuel tank 10. A check valve 14 for restricting back-flow of fuel 50 from the interior of the fuel tank 10 into the fuel fill pipe 12 is disposed at the end 12A of the fill pipe 12.

The other end 12B of the fuel fill pipe 12 reaches a fuel filler port formed in a side wall of the vehicle body. A filler cap or gas cap 16 is mounted on the end 12B of the fuel fill pipe 12. In order to refuel the vehicle, a fuel door is opened, and the filler cap 16 is removed so that a refueling gun can be inserted into the fill pipe 12. The liquid level of fuel within the fill pipe 12 is elevated during refueling, and fuel supply from the refueling gun is automatically stopped when a sensor provided on the refueling gun detects a full state of the fuel tank. One end 18A of a recirculation conduit 18 is connected to a portion of the fill pipe 12 that is close to the end 12B. The other end 18B of the recirculation conduit 18 is inserted in the fuel tank 10. A flow restricting portion 20 with a reduced inner diameter is formed at the end 18B of the recirculation conduit 18.

A differential pressure valve 22 is mounted in an upper wall portion 10B of the fuel tank 10. A vapor conduit 24 that leads to a canister (not shown) is connected to the differential pressure valve 22.

Figure 5:
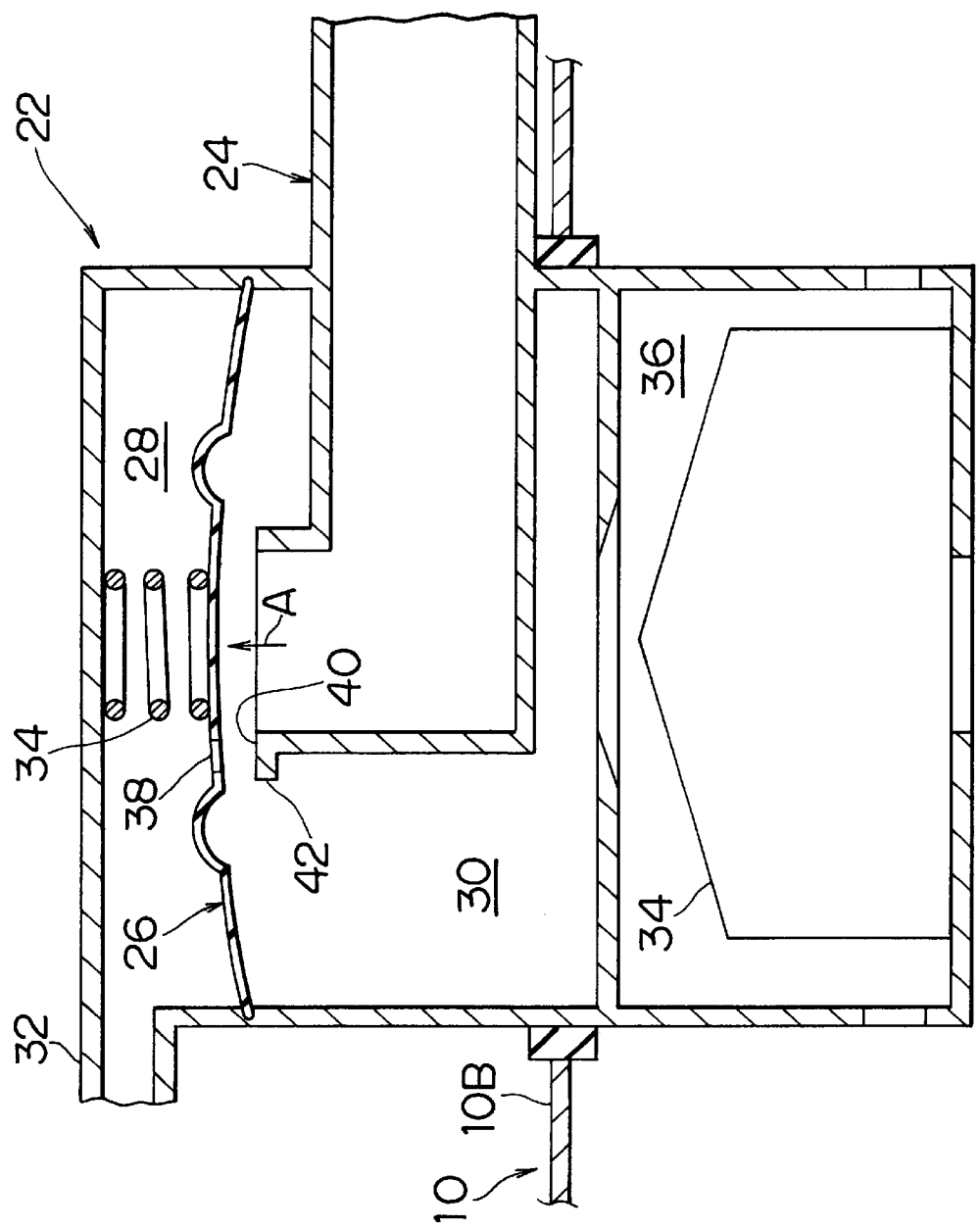
FIG. 5 is an enlarged cross-sectional view showing the differential pressure valve that is in an open state in the evaporative fuel emission control system according to the first embodiment of the invention.

The differential pressure valve 22 is divided into a back pressure chamber 28 and a tank chamber 30 by a diaphragm 26. The back pressure chamber is connected to the vicinity of the end 18A of the recirculation conduit 18 via a communication pipe 32. When the diaphragm 26 is curved toward the back pressure chamber 28 (in a direction indicated by arrow A in FIG. 5) against a biasing member 34, such as a spring, and is thus placed in its open state as shown in FIG. 5, the tank chamber 30 is brought into communication with the vapor conduit 24. The tank chamber 30 communicates with the inside of the fuel tank 10 via a valve chamber 36 in which a cut-off valve 34 is disposed.

Figure 4:
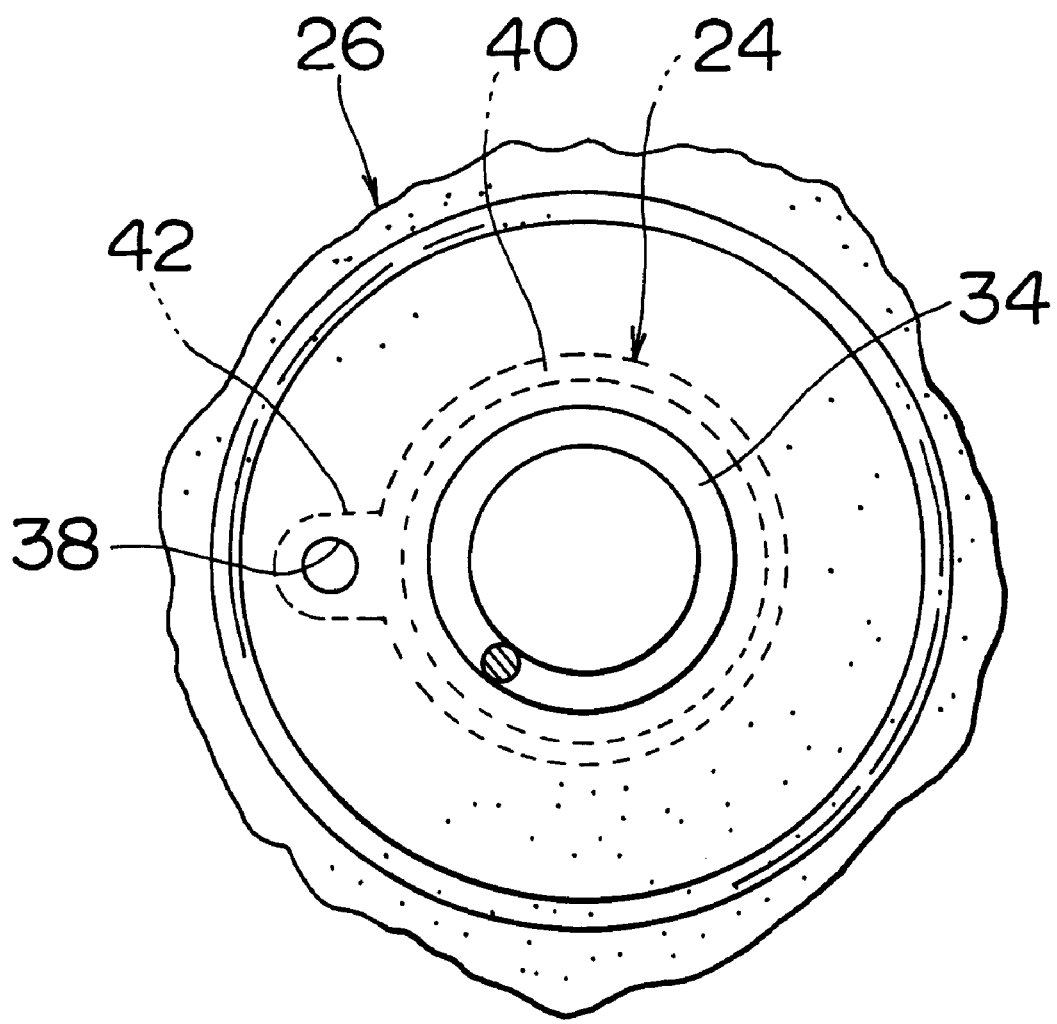
FIG. 4 is a cross-sectional view taken along line 4—4 of FIG. 3.

As shown in FIG. 4, the diaphragm 26 of this embodiment is formed with a communicating hole 38 for communication between the back pressure chamber 28 and the tank chamber 38. Also, the vapor conduit 24 is formed at an end portion thereof with a closed-state holding portion 42 that serves as a closure member for holding the communicating hole 38 in the closed state, such that the closed-state holding portion 42 is substantially aligned with the communicating hole 38.

Figure 3:
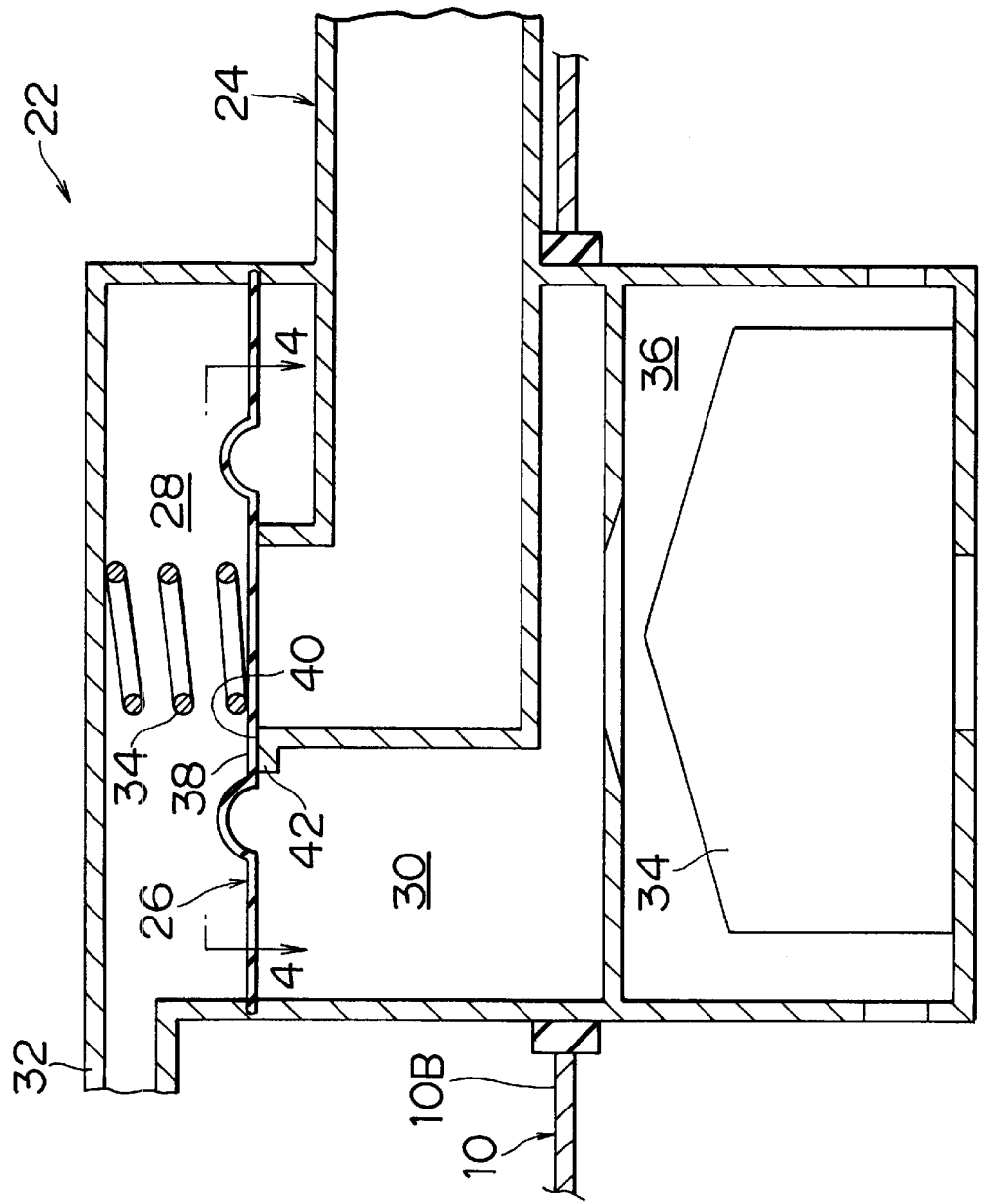
FIG. 3 is an enlarged cross-sectional view showing a differential pressure valve that is in a closed state in the evaporative fuel emission control system according to the first embodiment of the invention.

As shown in FIG. 3, the closed-state holding portion 42 takes the form of a projection which protrudes radially outwards from the vapor conduit 24, to provide a portion of a valve seat 40 of the differential pressure valve 22 that faces the communicating hole 38. When the diaphragm 26 is in the closed state as shown in FIG. 3, the diaphragm 26 abuts on the valve seat portion 40, and the communicating hole 38 is kept closed by the closed-state holding portion 42. When the diaphragm 26 is in the open state, as shown in FIG. 5, the diaphragm 26 is spaced apart from the valve seat portion 40, and the communicating hole 38 is brought into communication with the back pressure chamber 28 and the tank chamber 30.

As shown in FIG. 1, a pump unit 44 is disposed inside the fuel tank 10, and is adapted to supply fuel 50 to the engine.

Next, the operation of the first embodiment will be described.

In this embodiment, suppose that the liquid surface 50A of fuel 50 within the fuel tank 10 is inclined from a position as indicated by a dashed line to a position as indicated by a solid line in FIG. 1, during turning of the vehicle, such that the level of the liquid surface 50A becomes higher on the side of the fuel fill pipe 12 than on the other side of the fuel tank. In this case, the fuel 50 flows into the fill pipe 12 and the recirculation conduit 18 through the end 12A and the end 18B, respectively. As a result, a liquid level 50B in the fuel fill pipe 12 and a liquid level 50C in the recirculation conduit 18 are elevated, whereby the internal pressure P1 in the back pressure chamber 28 becomes higher than the internal pressure P2 in the tank chamber 30 (P1>P2) in the differential pressure valve 22. Consequently, the diaphragm 26 is placed in the closed state.

In this condition, the diaphragm 26 abuts on the closed-state holding portion 42, and the communicating hole 38 formed in the diaphragm 26 is held in the closed state, as shown in FIG. 3. Since the air pressure in the back pressure chamber 28 does not escape to the tank chamber 30 through the communicating hole 38, only a small amount of fuel 50 flows into the fuel fill tube 12 and the recirculation conduit 18.

Figure 2:
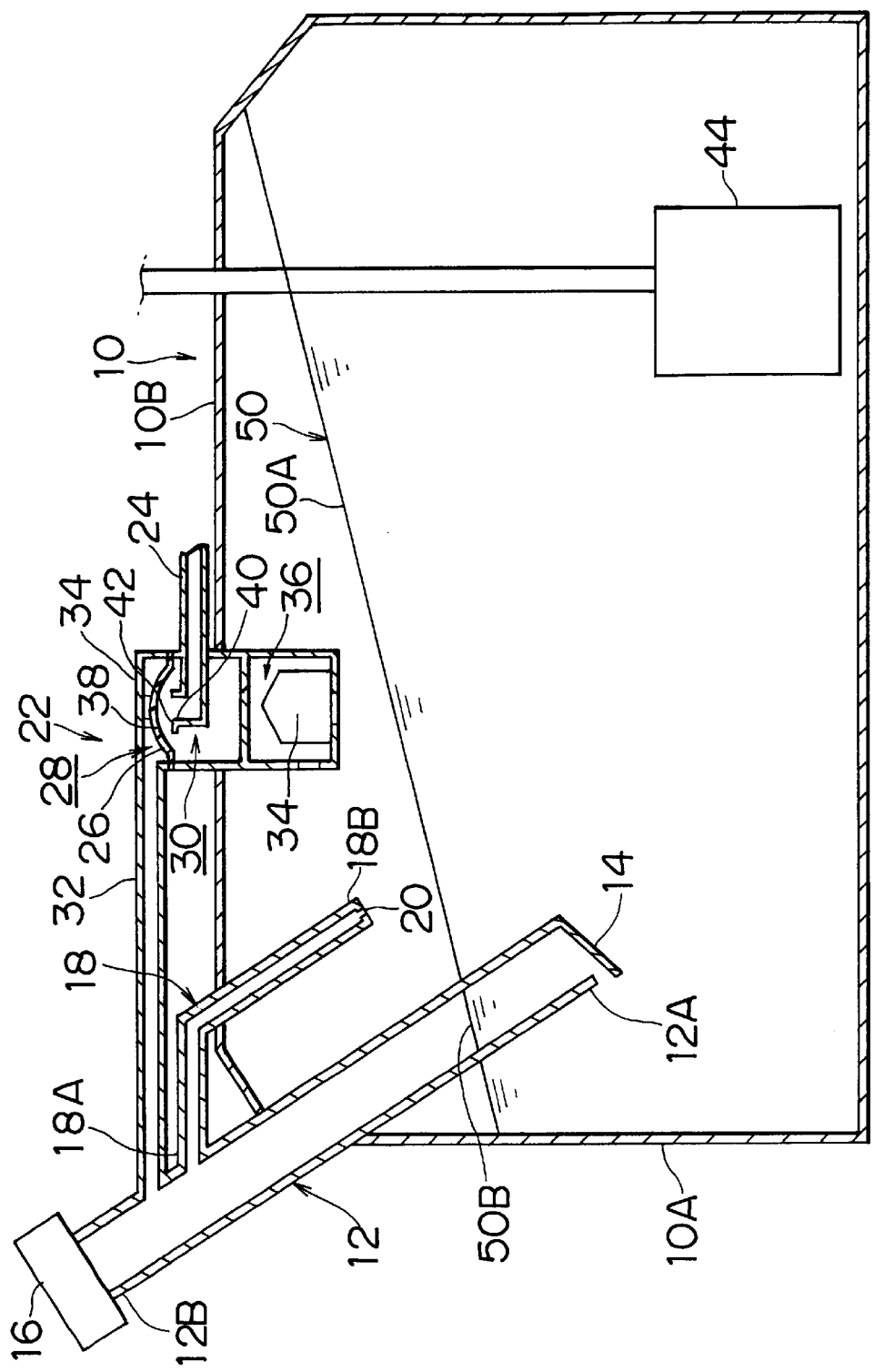
FIG. 2 is a schematic cross-sectional view of the evaporative emission control system of the first embodiment of the invention, in which the level of the liquid surface of fuel has been changed from the state of FIG. 1.

If the liquid surface 50A of fuel 50 within the fuel tank 10 is subsequently inclined such that the level of the liquid surface 50A becomes lower on the side of the fuel fill pipe 12 than on the other side of the fuel tank, as shown in FIG. 2, a negative pressure builds up in the back pressure chamber 28 of the differential pressure valve 22, namely, the internal pressure P1 in the back pressure chamber 28 becomes lower than the internal pressure P2 in the tank chamber 30 (P1<P2). As a result, the diaphragm 26 is curved toward the back pressure chamber 28 (in the direction as indicated by arrow A in FIG. 5) against the biasing member 34, and is brought into the open state, as shown in FIG. 5. At the same time, the communicating hole 38 is also brought into communication with the back pressure chamber 28 and the tank chamber 30. Thus, the small amount of fuel 50 that has entered the fuel fill pipe 12 and the recirculation conduit 18 returns to the interior of the fuel tank 10 in a short period of time, and the back pressure chamber 28 is brought into communication with the fuel tank 10 through the recirculation conduit 18. Although the diaphragm 26 is in the open, state while the fuel 50 that has entered the fill pipe 12 and recirculation conduit 18 returns to the fuel tank 10, it is possible to restrict or reduce the amount of evaporative fuel flowing toward the canister during running of the vehicle because only a short period of time is required to drain the fill pipe 12 and recirculation conduit 18.

In this embodiment, the closed-state holding portion 42 serving as a closure member for holding the communicating hole 38 formed in the diaphragm 26 in the closed state is formed at the valve seat portion 40 of the differential pressure valve 22. However, the positions at which the communicating hole 38 and the closed-state holding portion 42 are formed are not limited to these, but may be changed. For instance, the closure member may be provided at a position other than the valve seat portion 40 provided that the diaphragm 26 and the closure member 42 abut on each other so that the communicating hole 38 can be held in the closed state.

While only one communicating hole 38 is formed in the illustrated embodiment, a plurality of communicating holes may be formed. In this case, the diameter of the communicating holes is set to be large enough to be free from clogging by dust, and the like, and the total opening area of the communicating holes 38 is set to a value that assures a sufficient valve opening pressure to enable the diaphragm 26 to be lifted from the valve seat.

Next, an evaporative emission control system according to the second embodiment of the invention will be described with reference to FIG. 6 through FIG. 9.

In FIGS. 6–9, the same reference numerals as used in FIGS. 1–5 showing the first embodiment are used for identifying corresponding elements, of which no detailed description will be provided.

Figure 8:
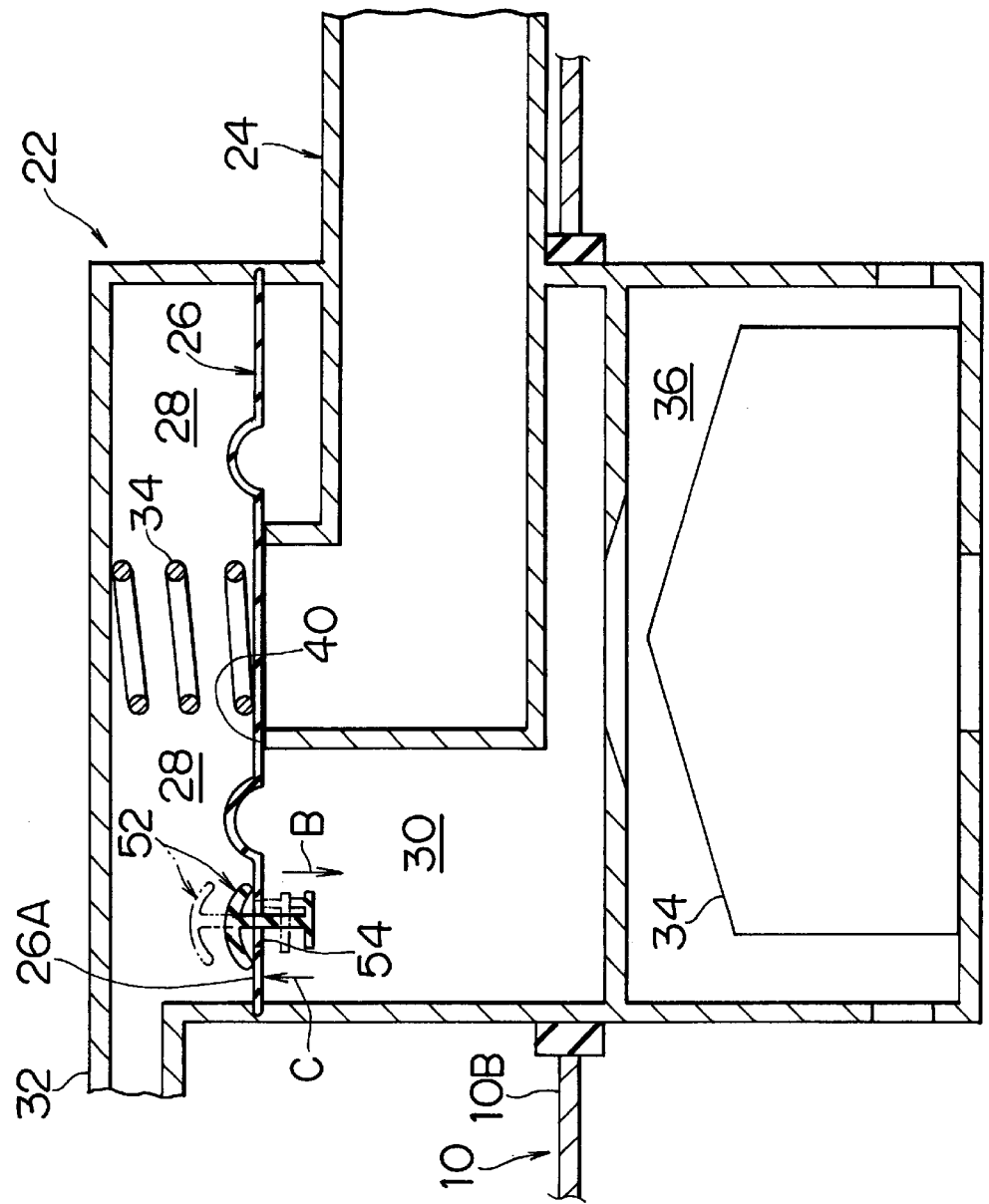
FIG. 8 is an enlarged cross-sectional view of a differential pressure valve in the evaporative emission control system according to the second embodiment of the invention.
Figure 9:
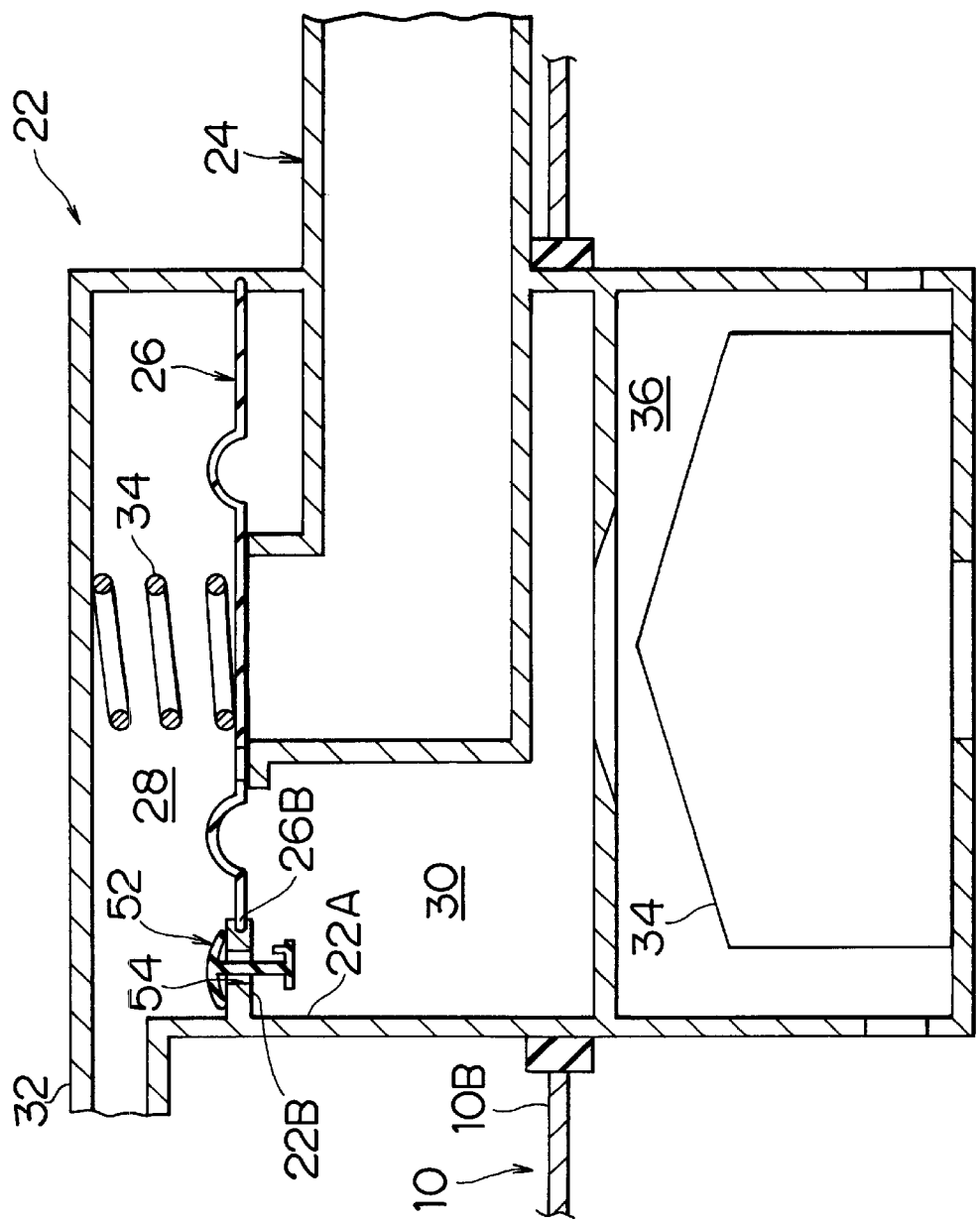
FIG. 9 is an enlarged cross-sectional view of a differential pressure valve in an vaporative emission control system as a modified example of the second embodiment of the invention.
Figure 10:
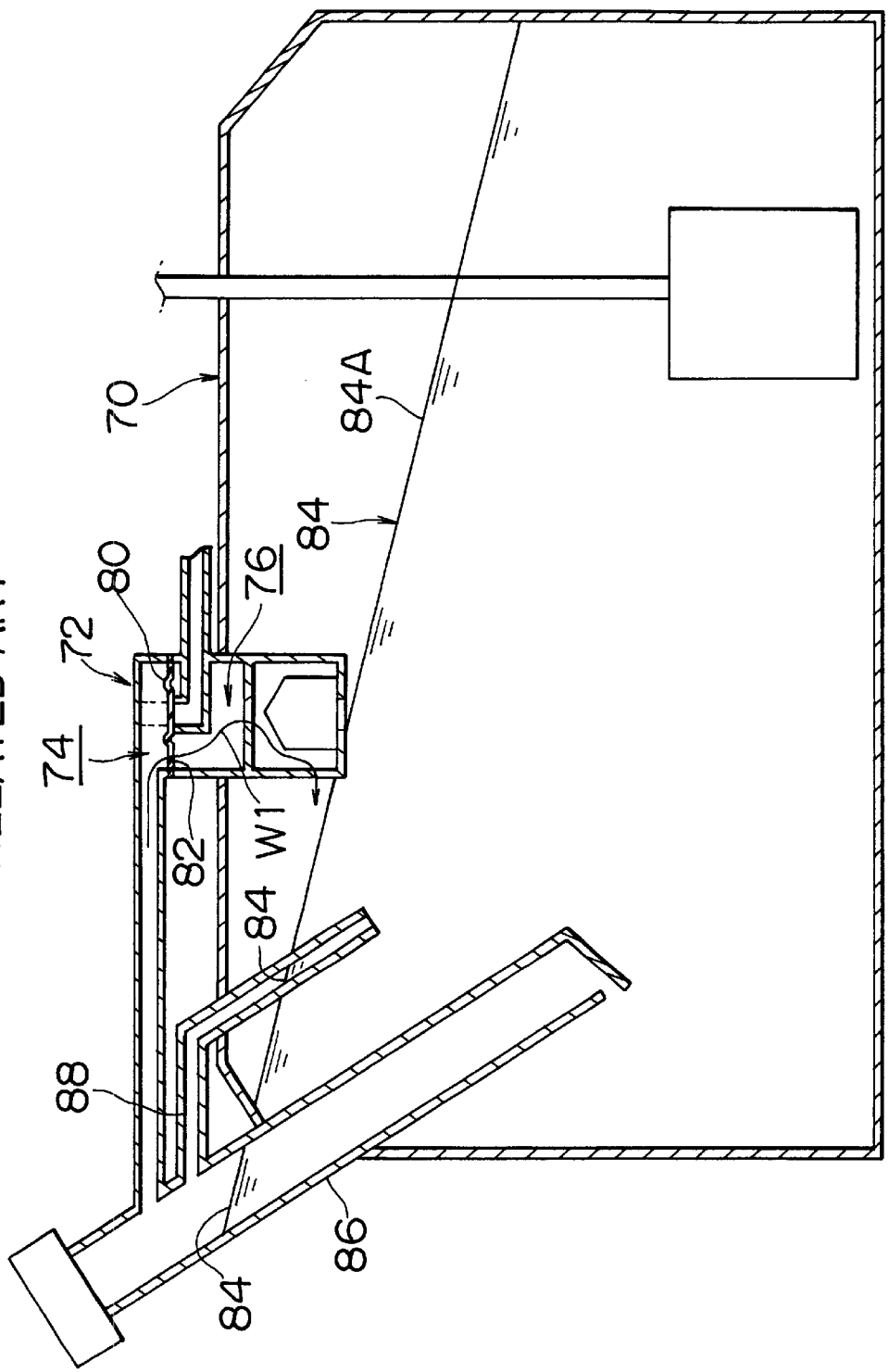
FIG. 10 is a schematic cross-sectional view showing a known evaporative emission control system.

In this embodiment, a check valve 52 is disposed in a portion 26A of the diaphragm 26 which separates or partitions the back pressure chamber 28 and the tank chamber 30 from each other, as shown in FIG. 8. The check valve 52 engages with a communicating hole 54 that serves as a communicating portion formed in the diaphragm 26. If a pressure higher than that in the tank chamber 30 is applied to the back pressure chamber 28, that is, if the internal pressure P1 in the back pressure chamber 28 is higher than at least the internal pressure P2 in the tank chamber 30 (P1>P2), the check valve 52 moves toward the tank chamber 30 (in a direction as indicated by arrow B in FIG. 8) thereby to close the communicating hole 54 as indicated by a solid line in FIG. 8.

On the other hand, if a pressure lower than that in the tank chamber 30 is applied to the back pressure chamber 28, that is, if the internal pressure P1 in the back pressure chamber 28 is lower than the internal pressure P2 in the tank chamber 30 (P1<P2), the check valve 52 moves toward the back pressure chamber 28 (in a direction indicated by arrow C in FIG. 8), to be placed in an open position as indicated by a dashed line in FIG. 8 (in which position the communicating hole 54 is not closed). The pressure required to open the check valve 52 is set to be lower than the pressure required to lift the diaphragm 26 away from the valve seat. Thus, the check valve 52 is opened before the diaphragm 26 is lifted away from the valve seat (i.e., before the opening of the differential pressure valve 22).

Next, the operation of this embodiment will be described.

Figure 6:
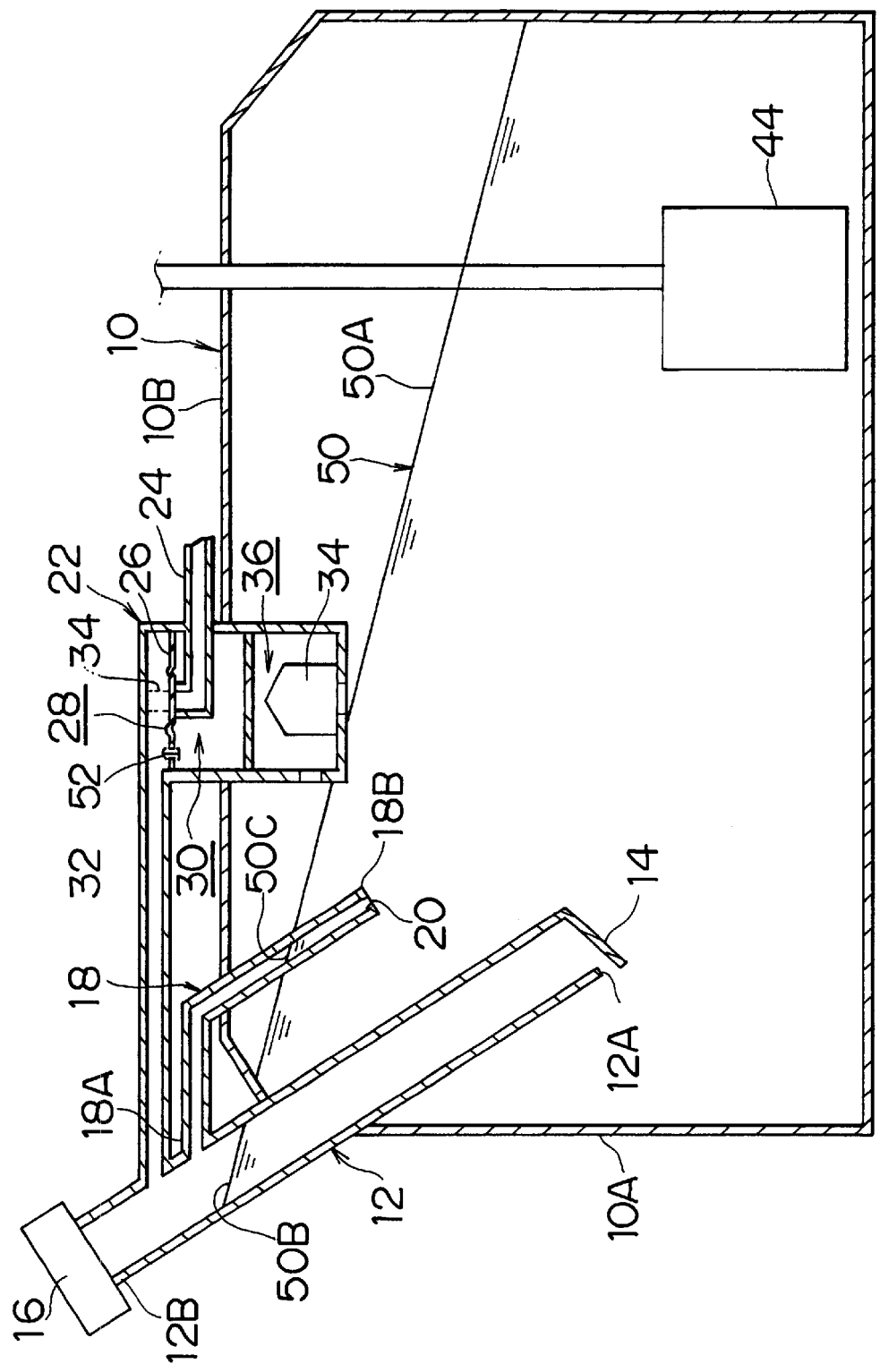
FIG. 6 is a schematic cross-sectional view of an evaporative emission control system according to a second embodiment of the present invention.

In this embodiment, when the liquid surface 50A of fuel 50 within the fuel tank 10 is inclined during turning of the vehicle, such that the level of the liquid surface 50A becomes higher on the side of the fuel fill pipe 12 than on the other side of the fuel tank, as shown in FIG. 6, the fuel 50 flows into the fuel fill pipe 12 and the recirculation conduit 18 through the end 12A and the end 18B, respectively. Thus, the liquid level 50B in the fill pipe 12 and the liquid level 50C in the recirculation conduit 18 are elevated, so that the internal pressure P1 in the back pressure chamber 28 becomes higher than the internal pressure P2 in the tank chamber 30 (P1>P2) in the differential pressure valve 22. As a result, the diaphragm 26 rests upon the valve seat (i.e., the differential pressure valve 22 is closed), and the communicating hole 54 is closed by the check valve 52 as indicated by the solid line in FIG. 8. In this case, since the air pressure in the back pressure chamber 28 is prevented from escaping to the tank chamber 30 through the communicating hole 54, only a small amount of fuel 50 flows into the fuel fill pipe 12 and the recirculation conduit 18.

Figure 7:
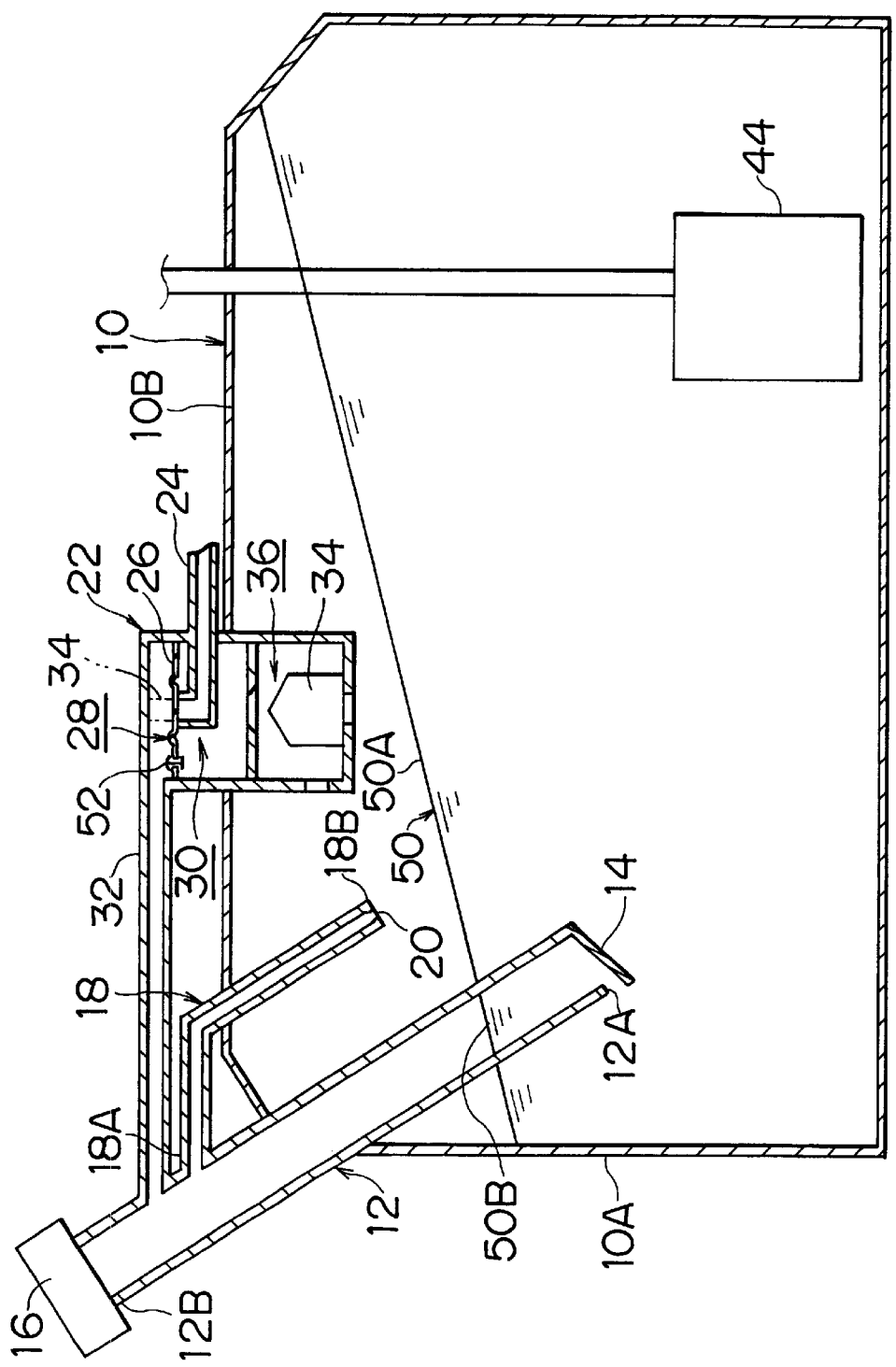
FIG. 7 is a schematic cross-sectional view of the evaporative emission control system of the second embodiment of the invention, in which the level of the liquid surface of fuel has been changed from the state of FIG. 6.

When the liquid surface 50A of fuel 50 within the fuel tank 10 is subsequently inclined during turning of the vehicle, such that the level of the liquid surface 50A becomes lower on the side of the fuel fill pipe 12 than on the other side of the fuel tank, as shown in FIG. 7, the fuel 50 that has entered the fuel fill pipe 12 and the recirculation conduit 18 can return to the fuel tank 10 in a short period of time. With the fuel 50 in the fuel fill pipe 12 and the recirculation conduit 18 thus returned to the fuel tank 10, a negative pressure builds up in the back pressure chamber 28 of the differential pressure valve 22 (P1<P2), with a result that the check valve 52 is opened before the diaphragm 26 is lifted away from the valve seat, as indicated by a two-dot chain line in FIG. 8. Thus, the fuel 50 that has entered the fill pipe 12 and the recirculation conduit 18 can be returned to the fuel tank 10 without requiring the diaphragm 26 to be lifted away from the valve seat. It is thus possible to prevent or inhibit evaporative fuel from flowing into the canister during running of the vehicle.

In the illustrated embodiment, the communicating hole 54 which receives the check valve 52 is formed through the diaphragm 26. It is, however, possible to form the communicating hole 54 as a communicating portion in a portion of the differential pressure valve 22 other than the diaphragm 26. For instance, the communicating hole 54 may be formed through a wall portion 22B that protrudes from an inner circumferential wall portion 22A of the differential pressure valve 22 so as to fixedly support an outer peripheral portion 26B of the diaphragm 26. It is also possible to provide a bypass passage as a communicating portion that communicates with the back pressure chamber 28 and the tank chamber 30, and dispose a check valve in the bypass passage.

It will be apparent to those skilled in the art that various modifications and variations can be made in the evaporative emission control system of the present invention without departing from the scope of the invention. It is intended that the present invention covers all such modifications and variations, provided they fall within the scope of the attached claims and their legal equivalents.

What is claimed is:

1. An evaporative emission control system, comprising:
    a differential pressure valve that controls fluid communication between a canister and a fuel tank, said differential pressure valve comprising a first chamber, a second chamber, a diaphragm separating said first chamber and second chamber from each other, and a valve seat that faces the diaphragm, said differential pressure valve being placed in a selected one of an open state in which the diaphragm is spaced apart from the valve seat, and a closed state in which the diaphragm rests on the valve seat, said diaphragm having a communicating hole defined therein; and
    a closure member positioned and configured to close the communicating hole of the diaphragm when the differential pressure valve is placed in the closed state, said-communicating hole communicating the first and second chambers with each other when the differential pressure valve is placed in the open state.

2. An evaporative emission control system comprising:
    a differential pressure valve that controls fluid communication between a canister and a fuel tank, said differential pressure valve comprising a first chamber, a second chamber, a diaphragm separating said first chamber and second chamber from each other, and a valve seat that faces the diaphragm, said differential pressure valve being placed in a selected one of an open state in which the diaphragm is spaced apart from the valve seat, and a closed state in which the diaphragm rests on the valve seat, said diaphragm having a communicating hole defined therein; and
    a closure member positioned and configured to close the communicating hole of the diaphragm when the differential pressure valve is placed in the closed state, said communicating hole communicating the first and second chambers with each other when the differential pressure valve is placed in the open state, wherein said closure member is formed as an integral portion of the valve seat.

3. An evaporative emission control system, comprising:
    a differential pressure valve that controls fluid communication between a canister and a fuel tank, said differential pressure valve comprising a back pressure chamber, a tank chamber, a diaphragm separating said back pressure chamber and said tank chamber from each other, and a valve seat that faces the diaphragm, said differential pressure valve being opened when the diaphragm is moved away from the valve seat, and including a communicating portion defined in the diaphragm that communicates with the back pressure chamber and the tank chamber;
    a closure member positioned and configured to close the communicating portion when a pressure within the back pressure chamber is higher than a pressure within the tank chamber, said closure member permitting the communicating portion to communicate with the back pressure chamber and the tank chamber before opening of the differential pressure valve when the pressure within the back pressure chamber becomes lower than the pressure within the tank chamber.

4. An evaporative emission control system according to claim 3, wherein said closure member comprises a check valve.

5. A method of controlling evaporative emissions in a vehicle, comprising the steps of:
    providing a differential pressure valve between a canister and a fuel tank of the vehicle, said differential pressure valve comprising a first chamber and a second chamber separated by a diaphragm, and a valve seat facing the diaphragm, said differential pressure valve being open when the diaphragm is spaced apart from the valve seat, and closed when the diaphragm rests on the valve seat, said diaphragm having a communicating hole defined therein;
    closing the communicating hole with an integral portion of the valve seat when the differential pressure valve is closed; and
    opening the communicating hole to place the first and second chamber in communication with each other when the differential pressure valve is open.

6. The method of claim 5, wherein the communicating hole is closed when a pressure in the first chamber exceeds a pressure in the second chamber communicating with the fuel tank.

7. The method of claim 5, wherein the communicating hole is open when a pressure in the second chamber communicating with the fuel tank exceeds a pressure in the first chamber.

* * * * *